Figure 5:
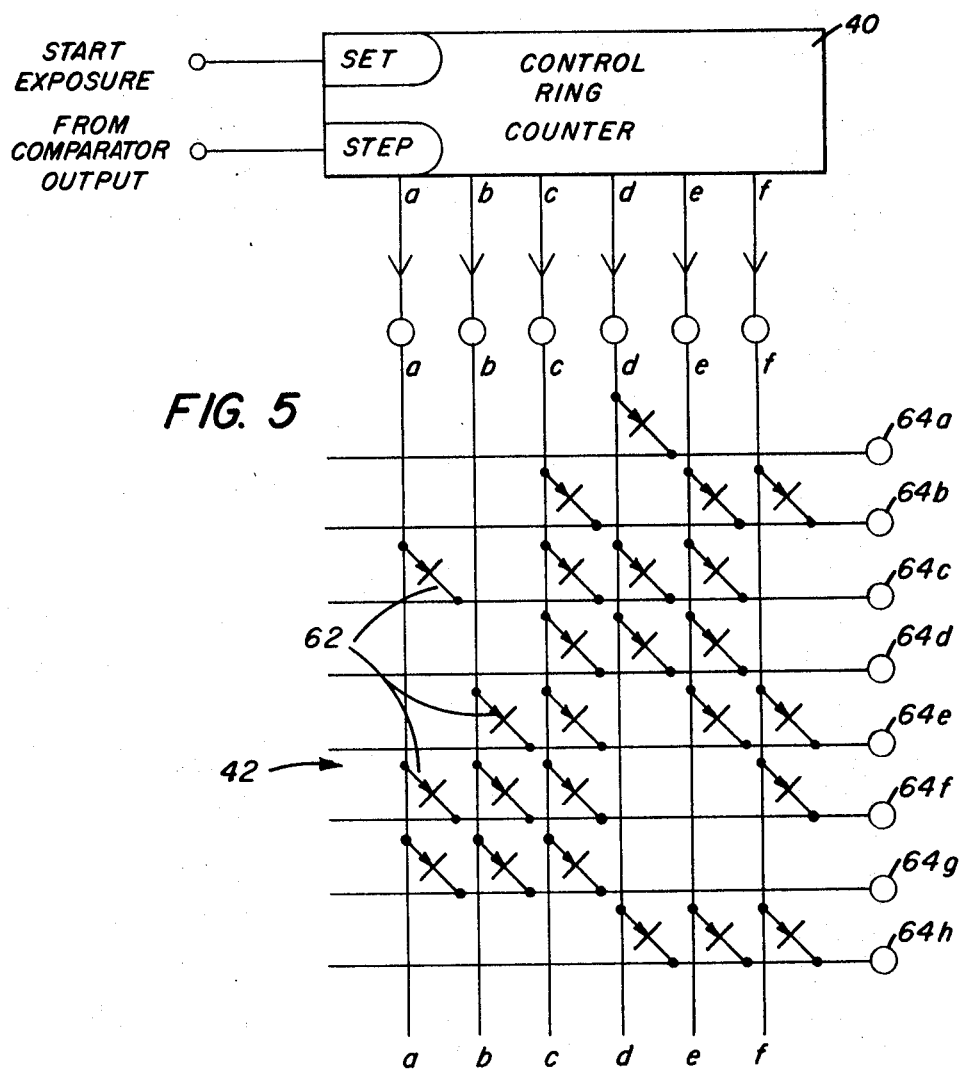

United States Patent   [11] 3,612,683

[72] Inventors Terry E. Riley;
 Raymond G. Rogers, both of Rochester, N.Y.
[21] Appl. No. 47,068
[22] Filed June 17, 1970
[45] Patented Oct. 12, 1971
[73] Assignee Eastman Kodak Company
 Rochester, N.Y.

[54] PHOTOGRAPHIC TIMING APPARATUS
 8 Claims, 7 Drawing Figs.
[52] U.S. Cl. ..................................... 355/35,
 356/175
[51] Int. Cl. ........................................ G03b 27/76
[50] Field of Search ........................................... 355/38, 35;
 356/175, 222, 223

[56] References Cited
UNITED STATES PATENTS
3,120,782 2/1964 Goddard et al. ............... 355/38 X
3,519,347 7/1970 Bowker et al. ................. 355/38 X
3,527,540 9/1970 Bowker et al. ................. 355/38 X Primary Examiner—Samuel S. Matthews
Assistant Examiner—Richard A. Wintercorn
Attorneys—Walter O. Hodsdon and Robert F. Cody ABSTRACT: A device is disclosed for accumulating, for three primary colors, the log times required to print photographically a population of negatives, and to count the negatives in the population. Based on such accumulations, the average log times of the population may be determined; and from such average log times, a setup calibration patch may be formulated for the printer. The device embodies an improved log time pulse generator.

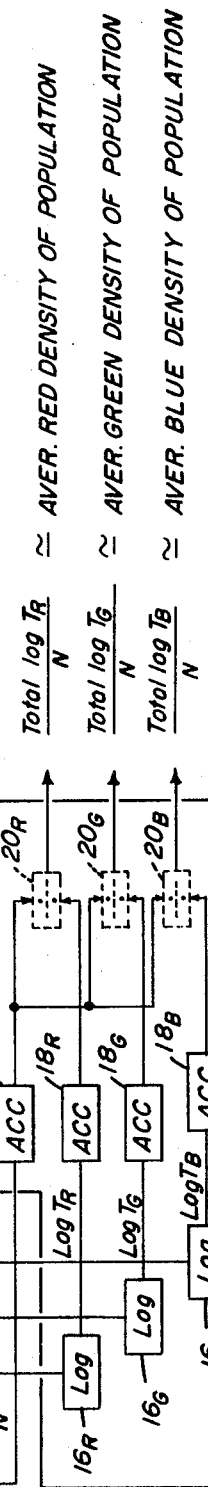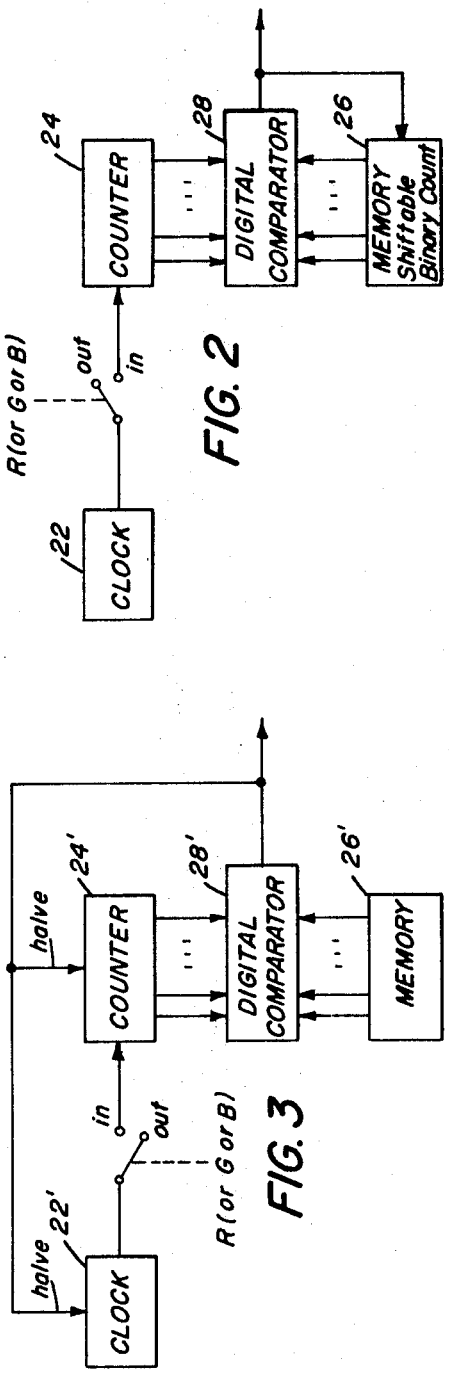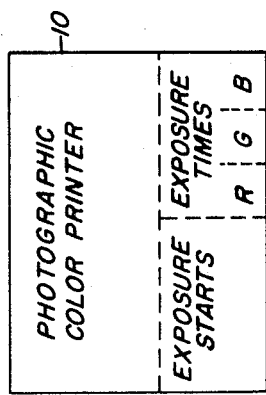

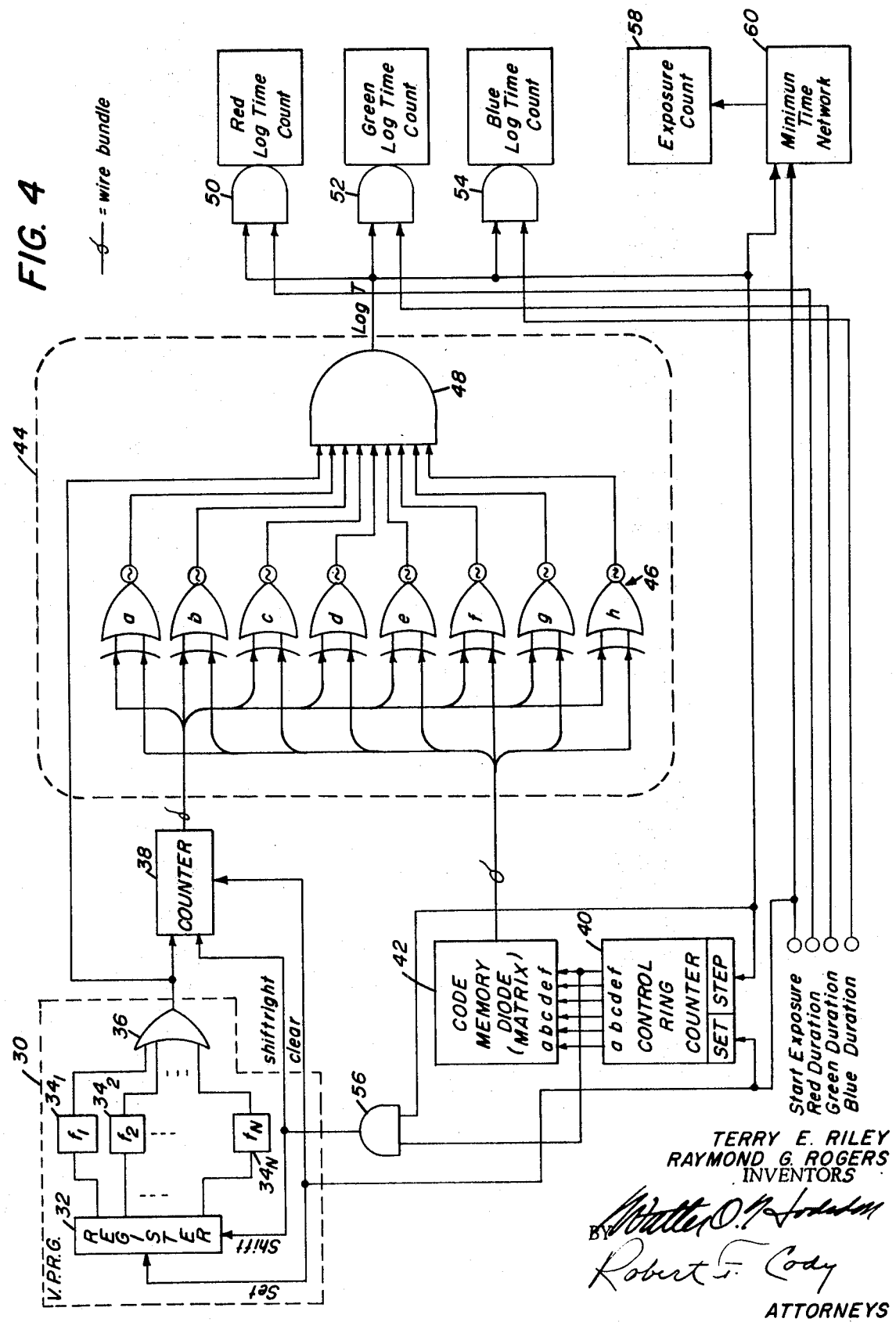

TERRY E. RILEY
RAYMOND G. ROGERS
INVENTORS

ATTORNEYS

PHOTOGRAPHIC TIMING APPARATUS

BACKGROUND OF THE INVENTION

1. Field of the Invention

This invention relates in general to photographic timing apparatus, and in particular to apparatus for determining the logarithms of various time measures, and of various time dependent variables.

The invention provides a device which is useful for producing a measure of the average time that it takes (for each of three color domains) to print photographically a population of film negatives.

2. Description Relative to the Prior Art

A typical photographic printer for making color prints from color negatives has a white light source therein, and positionable cyan, magenta, and yellow filters for selectively blocking the red, green, and blue components of the white light source from reaching the paper being photographically printed. During printing, the color filters are positioned to intercept the source light, after respective response durations which are in proportion to the respective color densities of the negative being printed. It has been the practice heretofore to include in such a printer an additional compound filter which has transmission densities, for red, green, and blue, which are such that, when printing from an "average" negative, all positionable filters pull-in together to intercept the source light. Thus, not only will efficient operation of the printer obtain, but also the printer will produce better quality prints, i.e. a color sensitive layer within the print material will not be exposed, via other color channels, after its own respective filter has been pulled-in.

To provide the above-mentioned simultaneous filter pull-in for an average negative, it is customary in the art to calibrate a printer by use of a "setup patch." A setup patch is a negative having color densities like the densities of an average negative which is to be handled by the printer. Thus, a compound filter is selected so that when printing the patch, all positionable filters pull-in together.

Since the kinds of prints that photofinishers make will vary from season to season, from photofinisher to photofinisher, from photographer to photographer, etc., the characteristics of the setup patch should vary; and therefore, depending on printing conditions, the setup calibration (and the patch) must be checked periodically.

The color densities of negatives processed by a printer are manifested in the logarithms of the exposure durations T which are commanded by the densitometry apparatus of such printer (i.e., $d \approx \log E \approx \log T$). It has been the practice heretofore for a phototechnician to accumulate (for each of three primary colors) the respective times required to print a given population of film negatives; then to take the logarithm of each of such time, then to add such log times, and then to divide such log time total by the number of negatives in the population to determine the average log time (average density) required to print the negatives in the population. Bases on such average log time, for each of the three primary colors, setup patches were then prepared.

SUMMARY OF THE INVENTION

Apparatus embodying the invention is adapted to be "plugged into" a photographic printer; and in response to the operation of the printer produces both an indication of the number (N) of exposure produced by the printer, and an indication of the total of the logarithms of the times (log T) required to make such exposures. Division of the total log T by N may either be automatic, or it may be calculated, thereby to determine the average log time required to print the N negatives.

Essential to the effectiveness of apparatus according to the invention is a specially designed pulse generator for producing, for each negative processed through the printer, pulses at logarithmically spaced times, the total number of such produced pulses being representative of the logarithm of the actual time that occurs between the first and the last of the pulses. Thus, in a simple version of the invention, if the exposure duration of a printer goes from 100 milliseconds, then to 200 milliseconds, then to 400 milliseconds, and then finally to 800 milliseconds, four pulses will be produced, indicating a log time count of four for the exposure. By multiplying such count by a constant (in this case, 0.301) that equals the difference in the logarithms (base 10) of any pair of adjacent pulse-producing times, the log time of the exposure may be determined.

To produce pulses at logarithmically spaced times, apparatus according to the invention employs a clock pulse generator, a counter responsive to count the clock pulses, and a count memory, cooperative with the counter, for triggering the production of log time count pulses when the memory count and the counter count coincide.

The design of the memory is of special importance, and consideration:

As implied above, the logarithm (to any base, say 10) of a time variable (i.e. $\log_{10} T$) increases linearly when the time variable increases logarithmically (even to a different base, say 2); and therefore a measure of the $\log_{10}$ of the time variable may be determined by counting pulses which are forced to occur at the logarithmically increasing times. By stating the logarithmically increasing time variable in binary form, each value thereof will be like each other value, save for a multiplier factor of 2 (i.e. a binary shift). Thus,

TABLE I

| Logarithmically (Base 2) Arranged Time T in Decimal Notation | $\log_{10} T$ | Binary Notation of the Logarithmically Arranged Time T |
|---|---|---|
| 100 | 2: | 01100100 |
|  | :$\Delta\log T = 0.3010$ |  |
| 200 | 2.3010: | 011001000 |
|  | :$\Delta\log T = 0.3010$ |  |
| 400 | 2.6021: | 0110010000 |
|  | :$\Delta\log T = 0.3010$ |  |
| 800 | 2.9031: | 01100100000 |
|  | :$\Delta\log T = 0.3010$ |  |
| 1,600 | 3.2041: | 011001000000 |
| . | . | . |
| . | . | . |

Corollarily, if the logarithmically increasing (base 2) decimal times are arranged in sets, the binary notations for such sets will also be in sets, and the corresponding terms of each such set will be alike, save for multiplier factors of 2 (i.e. binary shifts). Thus,

TABLE II

| Logarithmically (Base 2) Arranged Time Sets in Decimal Notation | $\log_{10} T$ | Binary Notation of the Logarithmically Arranged Time T |
|---|---|---|
| 100 | 2.0000 | 01100100 |
| 112 | 2.0492 | 01110000 |
| 126 | 2.1064 | 01111110 |
| 141 | 2.1492 | 10001101 |
| 158 | 2.1987 | 10011110 |
| 178 | 2.2504 | 10110010 |
|  |  |  |
| 200 | 2.3010 | 011001000 |
| 224 | 2.3502 | 011100000 |
| 252 | 2.4014 | 011111100 |
| 282 | 2.4502 | 100011010 |
| 316 | 2.4997 | 100111100 |
| 356 | 2.5514 | 101100100 |
|  |  |  |
| 400 | 2.6021 | 0110010000 |

A memory in accordance with table II above is employed by apparatus according to the invention; and therefore such memory need store only six discrete counts (provided, of course, that "shifting" is implemented). INn a presently preferred form of the invention, as will be appreciated later, such "shifting," rather than being direct, is simulated in a way that minimizes the number of stages which are required for the above-mentioned counter.

OBJECTS OF THE INVENTION

To provide a device that will accumulate the log times that are required to print photographically film negatives; and further to provide, for use in such a device, an improved pulse generator for producing a chain of pulses having a logarithmic occurrence rate.

Figure 7:
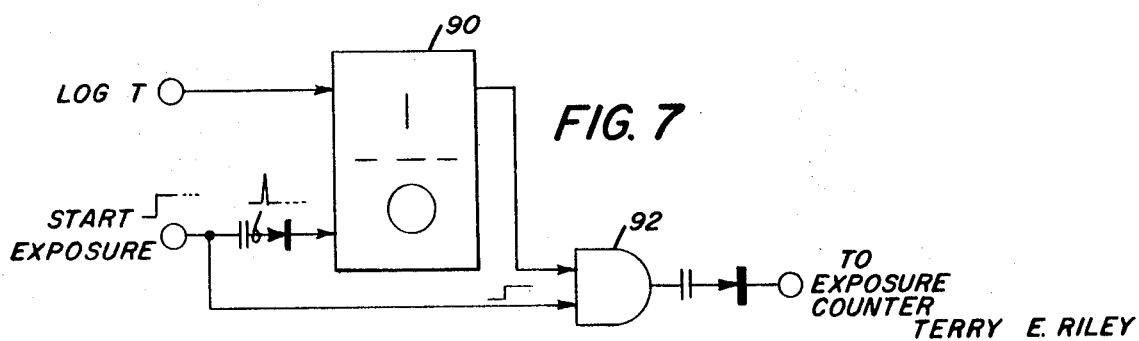
Figure 6:
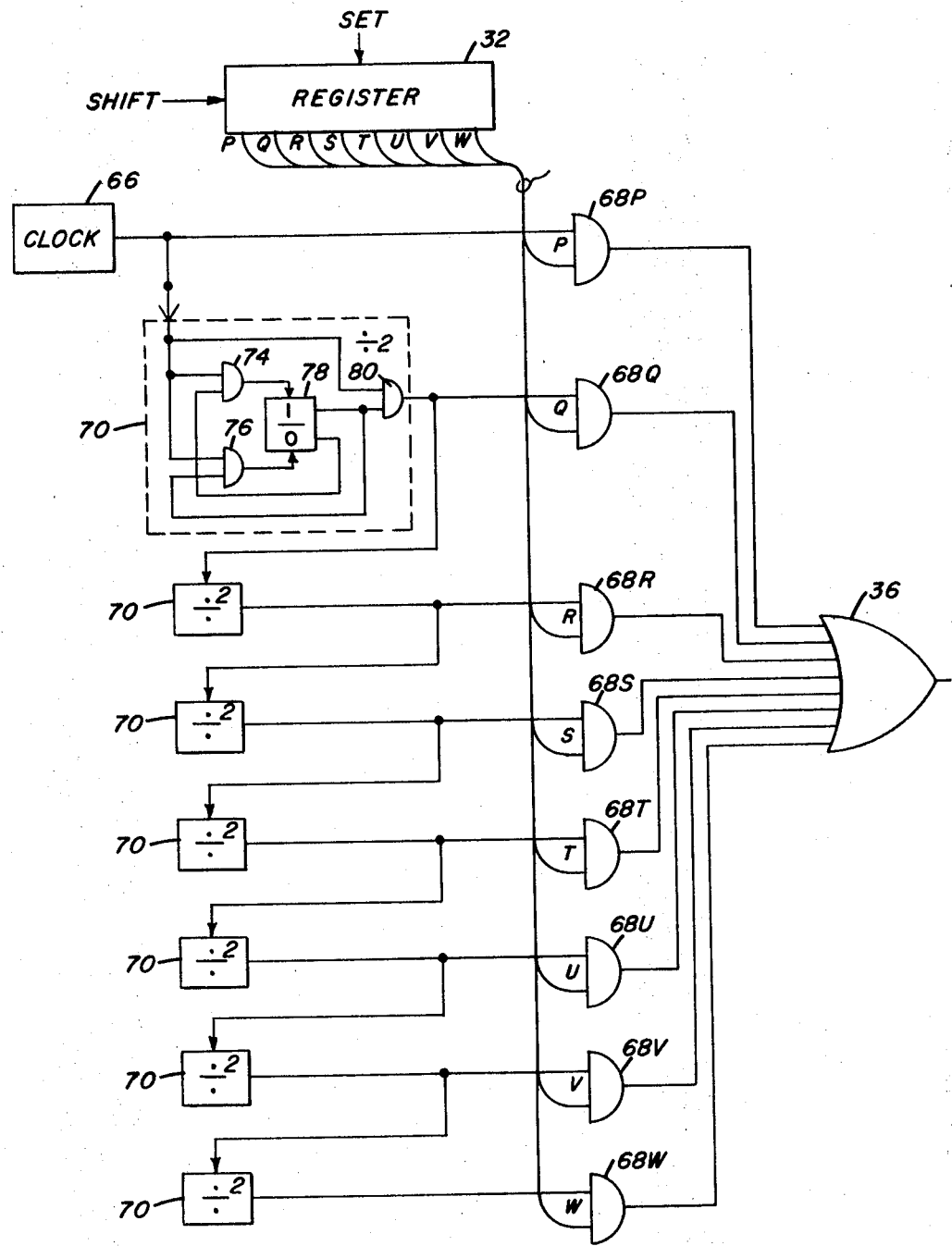

The invention will be described with reference to the FIGURES, wherein:

FIG. 1 is a basic block diagram illustrating the cooperation between a printer and the device of the invention, FIG. 2 is a block diagram indicating a pulse generator according to the invention, FIG. 3 is a block diagram indicating a presently preferred variation of the pulse generator indicated in FIG. 2, FIG. 4 is a block diagram depicting the arrangement and interconnection of circuits employed in the device of the invention, FIG. 5 is a diode memory matrix useful for implementing the invention, FIG. 6 indicates a pulse generator circuit useful for simulating the shifting of memory counts, and FIG. 7 is a diagram of a circuit useful for preventing unusually exposed negatives from influencing the negative count accumulation which is registered by the device of the invention.

Referring to FIG. 1, a photographic printer 10 is indicated processing photographic negatives and producing therefrom photographic prints. The printer 10 forms no part of the invention, but produces signals N and $T_{R,G,B}$ which are monitored by the log time totalizer apparatus 12 according to the invention. The subscripts R,G,B stand for red, green, and blue. The signal N, which occurs at the start of each exposure performed by the printer 10, is applied to an accumulator 14 so that a count may be made of the number of negatives processed by the printer 10. The signals T, which will vary from negative to negative, represent the respective durations that the densitometer section of the printer 10 commands for the color exposures which are to be for printing the respective negatives.

The log time totalizer 12 includes therein devices $16_{R,G,B}$ for producing signals representing the logarithms of the duration signals $T_{R,G,B}$; and accumulators $18_{R,G,B}$ for totaling the log times so produced. Divider devices $20_{R,G,B}$ responsive to the totaled log time and negative count signals, produce quotient signals representing the average log times required to print, in each of the three primary colors, from the population of negatives processed by the printer 10; and based on such average log times, a setup patch may be made so that efficient and effective use of the printer will obtain. The divider devices $20_{R,G,B}$ are depicted in phantom to indicate that, if preferred, the divisions need not be performed automatically.

As noted above, the invention proposes the generation of a number of pulses, representing the logarithm of time, by effectively counting clock pulses until a stored count, in binary form, has been reached; and then, in response to such happening, doing two things: (a) producing a log time count pulse, and (b) shifting the stored count in order to produce a new higher order count for comparison with the clock pulse count. With the above as background, consideration should be given to FIG. 2: A clock pulse generator 22 is adapted, say during the time that a red exposure is to be made, into a printer, to have its pulses counted by a counter 24. Stored in a shiftable memory 26 is a reference count; and both the counter 24 count and the memory 26 count are applied to a digital comparator 28, which may be of any well-known type. When the counter 24 count reaches the memory 26 count, the comparator 28 produces an output pulse, which gets applied both to an accumulator (not shown) and to the memory 26 to shift the stored count. The above is then repeated, only now the count of the counter 24 is compared with the shifted count, etc.; and as a result, the output of the comparator 28 is a pulse train that has a logarithmic occurrence rate, which is to say that an accumulator responsive to the pulse train would record a count equal to the logarithm of the duration during which clock pulses are applied to the counter 24.

Whereas the circuit of FIG. 2 is effective for its intended purpose so long as the counter 24 has enough stages to count to the repeatedly shifting memory 26 count, a modification of the circuit of FIG. 2, by effectively simulating "count shifting," permits the use of a counter having a minimal number of stages:

Referring to FIG. 3, a clock pulse generator 22' applies pulses to a counter 24' during the time that a red exposure is being made in a printer, A memory device 26' stores a reference count; and a digital comparator 28' compares the count of the counter 24' with the memory 26' count, producing at coincidence a log time pulse. Rather than apply the log time pulse to shift the memory count, such pulse is employed (a) to halve the rate at which clock pulses are applied to the counter 24' and (b) to halve the count of the counter 24'. That this has the effect of shifting the memory count, as in connection with the apparatus of FIG. 2, may be seen from the following: Assuming the memory 26' stores a binary count representing decimal 100, and that clock pulses occur initially at 1 millisecond intervals. At 100 milliseconds after a "start," the comparator 28 produces a log time pulse, and simultaneously halves the clock pulse rate, and the counter 24' count (i.e. the shifts the counter count one place to the right so that the counter 24' has therein the binary equivalent of decimal 50). With clock pulses now occurring every 2 milliseconds, 50 clock pulses occur during the next 100 milliseconds; but since the counter 24' starts counting with a bias count of "50," a second log time pulse occurs at 200 milliseconds after the "start." The second log time pulse again halves the clock pulse rate, and the count of the counter 24'. Since clock pulses now occur every 4 milliseconds, 50 clock pulses occur during the time between 200 milliseconds and 400 milliseconds after the "start"; and since the counter 24' again starts counting (at 200 milliseconds) with a bias count of "50," a third log time pulse occurs at 400 milliseconds after the "start," etc. Thus, it is seen that at 100 milliseconds, 200 milliseconds, 400 milliseconds, etc., pulses are forced to occur.

Apparatus according to the invention, in its presently preferred form, relies on the principles associated with the apparatus of FIG. 3, as modified in accordance with the concepts implicit in table II above.

Referring then to FIG. 4, a variable frequency pulse rate generator 30 is adapted to produce clock pulses at a first frequency $F_1$, then at a second frequency $F_2$ which is half the frequency $F_1$, then at a third frequency which is half the frequency $F_2$, etc. To this end, a shift register 32 is adapted to arm successive pulse sources $34_1$, $34_2$, etc.; and such pulse sources 34 apply their respective outputs, via an OR circuit 36, to a binary counter 38. At the start of an exposure, within a printer with which the device of FIG. 4 is cooperative, the counter 38 is cleared and a SET signal is applied to the register 32 so that, initially, pulses at the highest pulse rate ($F_1$) are applied to the counter 38. Simultaneous with the start of the $F_1$ pulses, a ring counter 40 is set so that the first of a set of memorized eight-bit counts may be read out of a memory 42 and applied to a count comparator 44. The memory 42 stores six counts (see table II) which are so logarithmically (base 10) related that the differences between the logarithms (base 10) thereof will be substantially linearly disposed. The comparator 44 includes an array of eight exclusive NOR circuits 46 (a-h) which receive the corresponding bits of the counter (38) and memory counts and, when such counts are identical, an AND circuit 48 produces an output pulse, i.e. a log time pulse.

The log time pulse from the AND circuit 48 is applied to AND circuits 50, 52, 54; which circuits also receive gating signals, respectively, for as long as the red, green, and blue exposures are being made in the printer with which the FIG. 4 device is cooperative.

The pulse output from the AND circuit 48 is also applied to step the ring counter 40 so that, as each log time pulse occurs, the ring counter causes the memory 42 to present a new eight-bit count for purposes of comparison with the count of a counter 38. Since the set of memory counts are logarithmically disposed (base 10), the occurrence rate of pulses at the output of the AND circuit 48 is logarithmic (base 10). When the last of the memory counts has resulted in a log time pulse, however, the ring count 40—while switching back to the first of the memory circuits—causes a pulse to be applied to an AND circuit 56. The AND circuit 56 also receives the log time pulses and, thus, after each full run through the counts of the memory 42, a pulse is applied from the AND circuit 56 (a) to step the register to a "halved" pulse frequency, and (b) to halve the count of the counter 38 by a "shift right." Such a practice is in accordance with the teaching of FIG. 3, and table II, and results—by virtue of "base 2" shifting—in a train of pulses which are, timewise, logarithmically disposed (base 10); and such pulse train occurs without the need to memorize a large number of reference counts, and without the need for a counter with a large number of stages.

Subject to a limitation to be discussed presently, each negative which is processed through a printer, with which the device of FIG. 4 is cooperative, causes a pulse to be applied to a counter 58. Thus, knowing the number of negatives and the total log time counts for the red, green, and blue exposures for all the negatives which have been processed through a printer, the average log times for such negatives—for red, green, and blue—may be obtained; and from such average log times the above-mentioned setup patch may be produced.

To prevent negatives which are unusually underexposed (say those requiring an exposure time which is less than 100 milliseconds) from influencing the averaging of log times, apparatus according to the invention includes therein a network 60 which assures that such underexposed negatives do not get counted in making averages. The operation of this network will be discussed later in connection with FIG. 7.

Referring to FIG. 5, the cooperation of the ring counter 40 and the count memory 42 will now be discussed: When the ring counter 40 excites respectively, and successively, lines a through f of the memory 42, memory diodes 62 within the memory get biased to produce, on the memory output contacts 64 a-h, the time counts 01100100; 01110000; 01111110; 10001101; 10011110; 10110010. And, it is the bits of these time counts which are compared with the bits of the counter 38 counts (by means of the exclusive NOR circuits 46 a-h) to produce log time pulses.

Referring to FIG. 6, the variable pulse rate generator 30 will now be discussed: A clock pulse generator 66 produces pulses, say, at the rate of one pulse per millisecond. The clock pulse generator 66 applies to its pulses to an AND circuit 68P, and to the first of a series of interconnected "divide-by-two" circuits 70. Each divide-by-two circuit includes a pair of AND circuits 74, 76 which cooperate to set and reset a flip-flop 78. With the flip-flop circuit 78 initially in its ONE state, the first clock pulse passes through the circuit 74, and through an AND circuit 80. The first clock pulse, in passing through the AND circuit 74, causes the flip-flop 78 to switch to its ZERO state. With the flip-flop 78 now in its ZERO state, the second clock pulse passes through the AND circuit 76 to switch the flip-flop back to its ONE state; but since the clock input to the AND circuit 76 is isolated from the AND circuit 80, such second clock pulse is prevented from passing through the AND circuit 80. The above is repeated for the third and fourth pulses, the fifth and sixth pulses, etc., so that the AND circuit 80 produces a stream of pulses which occur at one-half the rate at which the clock pulses occur. In like manner, other divide-by-two circuits 70 halve the frequencies of their respective input pulse trains. Each divide-by-two circuit 70 cooperates with a respective AND circuit $68_Q$ through $68_W$; and the AND circuits 68P through 68W are successively armed by the shift register 32.

Concerning the minimum time network 60, which assures against counting unusually short exposures in the average process, reference should be had to FIG. 7: The initiation of the exposure period causes a flip-flop 90 to switch to its ONE state (if it is not already in such state); and such exposure initiation arms an AND circuit 92 which is disposed to pass pulse signals which occur when the flip-flop 90 switches from its ONE state to its ZERO state. As soon as the first log time pulse exits from the AND circuit 48 (FIG. 4)—indicating a log time count which is at least long enough to be counted in the averaging process, the flip-flop 90 switches back to its ZERO state. This action causes the exposure counter 58 to register a count; and subsequent log time pulses for the negative being printed have no effect on the counter 58 since the flip-flop 90 has already been set to its ZERO state.

The invention has been described in detail with particular reference to preferred embodiments thereof, but it will be understood that variations and modifications can be effected within the spirit and scope of the invention.

What is claimed is:

1. Log time accumulator apparatus for use with a color photographic printer of the type having means for producing signals for signalling the start of an exposure within said printer and the duration of the red, green, and blue portions of said exposure comprising:
   a. first means responsive to said exposure start signals for counting the number of such signals produced by said printer while processing a given population of photographic negatives,
   b. second, third, and fourth means responsive to said signals representing said red, green, and blue durations respectively, for producing signals that correspond with the logarithms of said durations, and
   c. fifth, sixth, and seventh means for accumulating respectively said logarithmic signals, and producing therefrom respective counts representing accumulated log times, whereby the respective red, green, and blue average log times for exposures within said printer may be determined by dividing the respective accumulated log time counts by the count of said first means.

2. Log time accumulator apparatus for use with a color photographic printer of the type having means for producing signals for signalling the start of an exposure within said printer and the duration of the red, green, and blue portions of said exposure comprising:
   a. first means responsive to said exposure start signals for counting the number of such signals produced by said printer while processing a given population of photographic negatives,
   b. first, second, and third gate means respectively responsive to said signals representing said red, green, and blue portions of said exposure duration,
   c. first, second, and third accumulating means, cooperative with said first, second, and third gate means, for counting pulses respectively applied to said first, second, and third accumulating means,
   d. a source of timed pulses,
   e. a memory device for storing signals representing at least one reference count in binary form,
   f. a counter for binary counting said timed pulses,
   g. means for comparing signals representing the count of said counter with said signals representing said reference count and producing, when the said signal counts are the same, an output pulse, and h. means responsive to said output pulse for altering at least one of the sources of comparison counts so that a longer duration occurs between subsequent pairs of output pulses than former pairs of output pulses, said output pulses being applied through said first, second, and third gate means to respectively said first, second, and third accumulating means.

3. The apparatus of claim 2,
 a. wherein said memory device stores signals representing a plurality of counts all of which are sufficiently different from each other that their respective logarithms, to the base 10, increase in a linear manner, and
 b. wherein said apparatus includes means responsive to said output pulses to apply successively the signals representing said counts to the said means for comparing signals.

4. The apparatus of claim 2,
 a. wherein said source of timed pulses is a variable frequency pulse source,
 b. wherein said counter is shiftable,
 c. wherein said means responsive to output pulses cyclically applies successively the signal representative counts to said signal comparing means, and
 d. wherein said means for altering the sources of comparison counts cooperates, at the start of each new cyclic application of signal counts to said signal comparing means, with said pulse source and said counter to halve the pulse rate of the source and shift the count of the counter downwardly one binary bit.

5. The apparatus of claim 3,
 a. wherein said source of timed pulses is a variable frequency pulse source,
 b. wherein said counter is shiftable,
 c. wherein said means responsive to output pulses to apply is a ring counter,
 d. wherein said apparatus includes means for producing a step signal when the ring counter switches from its highest count to its lowest count, and
 e. wherein said means for altering the sources of comparison counts cooperates, in response both to said output pulses and to said step signal, with said pulse source and said counter to halve the pulse rate of the source and shift the counter downwardly one binary bit.

6. The apparatus of claim 2 including means for preventing said first means from counting until at least one pulse has been applied to any one of said accumulating means.

7. A log time base pulse generator comprising:
 a. a memory of a plurality of binary counts which are sufficiently different from each other that their logarithms, to the base 10, are different from each other by substantially the same amount,
 b. a source of timed pulses,
 c. a shiftable binary count for counting said timed pulses,
 d. count comparison means for receiving the count of said counter,
 e. pulse responsive means for applying said memory counts successively and cyclically to said count comparison means for comparison with said counter counts, said comparison means producing an output pulse when its two applied counts are the same, said output pulse being applied to said pulse responsive means, and
 f. means responsive after each cyclic application of memory counts to said count comparison means to halve the rate of application of timed pulses to said counter, and to shift downwardly the count of said counter by one binary bit.

8. The apparatus of claim 7 wherein said pulse responsive means is a ring counter.